Figure 1:
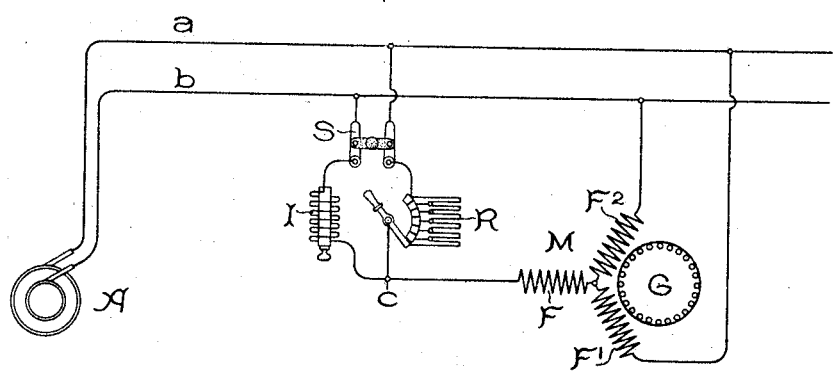

No. 620,988. Patented Mar. 14, 1899.
C. P. STEINMETZ & E. J. BERG.
SELF STARTING ALTERNATING CURRENT MOTOR.
(Application filed Sept. 10, 1895.)
(No Model.)

WITNESSES.
A. H. Abell.
E. W. Cady

INVENTORS.
Charles P. Steinmetz and
Ernst J. Berg, by
Geo. B. Blodgett,
atty.

THE NORRIS PETERS CO., PHOTO-LITHO., WASHINGTON, D. C.

UNITED STATES PATENT OFFICE.

CHARLES P. STEINMETZ AND ERNST J. BERG, OF SCHENECTADY, NEW YORK, ASSIGNORS TO THE GENERAL ELECTRIC COMPANY, OF NEW YORK.

SELF-STARTING ALTERNATING-CURRENT MOTOR.

SPECIFICATION forming part of Letters Patent No. 620,988, dated March 14, 1899.

Application filed September 10, 1895. Serial No. 562,037. (No model.)

*To all whom it may concern:*

Be it known that we, CHARLES P. STEINMETZ, a subject of the Emperor of Germany, and ERNST J. BERG, a subject of the King of Sweden and Norway, residing at Schenectady, county of Schenectady, and State of New York, have invented certain new and useful Improvements in Self-Starting Alternating-Current Motors, of which the following is a specification.

Our invention relates to starting devices for alternating-current motors, being particularly applicable to induction-motors, although it may be used also with synchronous machines.

It has for its object to provide a simple and efficient means of starting alternating-current motors, and is particularly designed to obviate the present difficulties attending their use upon single-phase circuits. By the arrangements which we have described it is possible to start alternating-current motors under load and with sufficient torque to render them adaptable to the ordinary uses of electric motors without other special arrangements for running them up to synchronism before throwing on the load. To attain these ends, we may employ any of the modern types of induction or synchronous motors having windings adapting them for use in polyphase systems. We preferably employ an ordinary three-phase motor of the induction type, this being readily adapted to our device; but our invention is not limited in this regard, for we may substitute a two-phase motor or a monocyclic motor like that described in the patent to Steinmetz, No. 533,250. In general, a single-phase motor, either of the induction or synchronous type, will not start when current is first turned on, and this has been the main objection to the use of such motors. Even when started such motors generally run until full speed is reached with very little torque. By our invention, however, these difficulties are obviated. With it we take an ordinary three-terminal motor of any of the types above suggested and connect one of its terminals to one side and one to the other side of the single-phase circuit, between the lines of which any desired electromotive force is maintained. The other terminal of the motor we connect to both of the lines through phase-modifying devices. For this purpose we prefer suitable combinations of resistance, reactance, and capacity, which are obtained, as in other cases, by the use of common forms of rheostat, inductive coil, and condenser. It is, of course, possible to make a great many different arrangements of these devices without affecting the essence of our invention. Some of the arrangements are illustrated in the accompanying drawings in diagram.

In another pending application, Serial No. 620,741, filed January 26, 1897, we have illustrated some other special arrangements of our invention, and in connection with them we have also employed for the purpose of illustrating their application some of the drawings used in this application. We mean, however, to have the claims in that application taken as specific to those in this, embracing our broader claims in this case and claiming in that detail ways of applying the principles set out herein.

Figure 2:
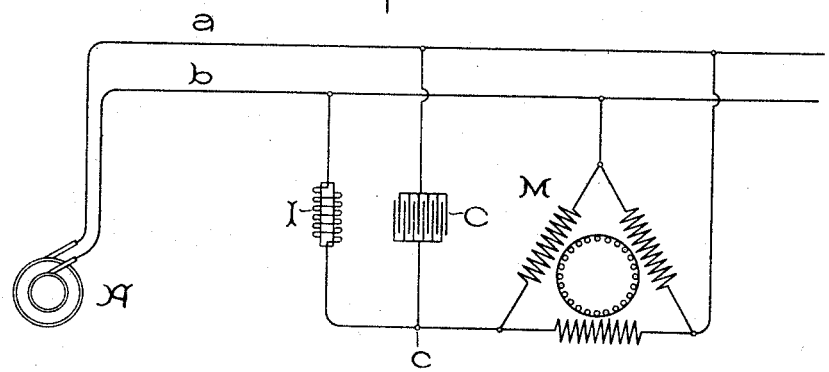
Figure 2:
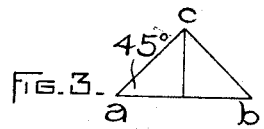
Figure 3:
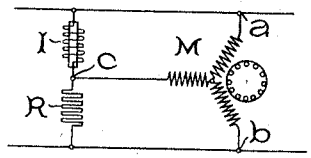
Figure 3:
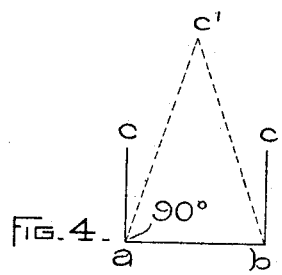
Figure 4:
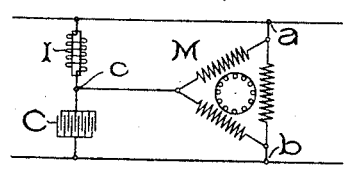

In the drawings annexed to this specification, Figure 1 is a diagram illustrating our invention applied to a three-phase motor in which an inductance and resistance are the phase-modifying devices used. In Fig. 2 we have shown substantially the same combination as in Fig. 1, except that the inductive coil and condenser are employed. Figs. 3 and 4 are certain diagrams illustrating the electric actions as we at present understand them.

In Fig. 1, A is a generator of alternating electromotive forces to be maintained between the positive and negative mains $a\ b$. M is a motor connected by two of its terminals across the mains $a\ b$. The inducing member of this motor is shown as composed of three coils F F' F$^2$, and the armature G is arranged, as is customary, for rotation in the field of the coils. It is of the ordinary closed-circuited type. The field is shown in this diagram as Y-connected. The terminal coil F$^2$ is connected to the main $b$, the coil F' to the main $a$, while the coil F (there being three coils in the motor shown) is connected through phase-modifying devices to both of the mains.
The phase-modifying devices of this figure consist of an inductance I and a resistance R. These are connected in series across the mains of the circuit and are thrown into and out of circuit by the switch S of the ordinary double-pole type. At their common junction c they are connected, as described, to the coil F.

In practical operation at starting the switch S is closed and the terminals of the field are thus all connected to line. Two of the coils are energized by the main electromotive force across the circuit, while the third coil is energized by an electromotive force of displaced phase generated by the inductance I and resistance R. The motor has impressed upon it, according to the proportion of the inductance, resistance, or capacity in the circuit of the third coil, either true three-phase electromotive force or quarter-face or other desired phase displacement—such, for instance, as that of the monocyclic system above referred to. When it is energized, the motor starts under load and gradually speeds up until it runs as an ordinary induction-motor of the single-phase type. By this time the switch S may be opened and the motor will take its entire energy directly from the mains. If, however, the phase-modifying devices be of such a type and character as to remain uninjured by the current, they may be left permanently in circuit.

In Fig. 2 we show a phase displacing or modifying means consisting of a condenser C and an inductance I, connected like the arrangement shown in Fig. 1. In this case we have illustrated a delta-wound motor, it being of course immaterial which type is used in our invention.

Referring to Figs. 3 and 4, we illustrate what we conceive to be the operation of the phase-modifying devices. In Fig. 3 we have shown diagrammatically an arrangement like that shown in Fig. 1. The main electromotive force across the lines is shown in the triangle of electromotive forces forming a part of the figure at $a\ b$, while the auxiliary electromotive force is measured by the displacement of the point $c$ in the triangle. By employing suitable amounts of inductance and resistance we may obtain an exact or approximate ninety-degree displacement, as may be desired, suitable for operating a motor of the quarter-phase type, it being understood that the inductance tends to create a lag, while the resistance tends to preserve the phase of the electromotive force, and thus by proper proportioning of the two factors we may obtain within reasonable limits such displacement as is desired. In Fig. 4, however, the phase-modifying means consists of the inductance I and condenser or equivalent capacity reactance arranged in series with the third conductor leading from the common junction $c$. The triangle of electromotive forces is in the upper part of the figure. As before, the main electromotive force is represented by the lines $a\ b$. The effect of the inductance I is theoretically to produce a lag of ninety degrees, while the condenser theoretically produces a lead of ninety degrees, so that if the devices could be made without resistance there would be no meeting-point to determine the extent of the displacement of phase. As, however, it is impossible to make these devices without resistance the common junction at $c'$, as indicated in dotted lines, will be obtained, which, however, is very far off. The phase-modifying devices and motor-windings may be so proportioned as to give currents displaced by one-third of a period from one another, which is the arrangement best suited to the well-known three-phase motor. By following the principles which we have pointed out this can easily be done. The phase displacement being external to and independent of the motor any desired type of armature may be used and external resistance in its circuit may be dispensed with, as by our invention we may start motors having squirrel-cage armatures of very low or even practically no resistance, whereas other devices for starting—such, for instance, as a shaded pole—work best when the armature has a large resistance.

The starting device of our invention we have found to be useful both with small and large motors.

What we claim is—

1. In a single-phase alternating-current system of electrical distribution, an alternating-current motor having exciting-windings connected directly to the supply-mains of the system, phase-modifying devices connected across the said mains and in parallel with the above-named exciting-windings, and other exciting-windings connected through phase-modifying devices to the supply-mains.

2. In a single-phase alternating-current system of electrical distribution, an alternating-current motor having exciting-windings connected directly to the supply-mains of the system, said exciting-coils containing no phase-shifting devices, phase-modifying devices connected across the said mains and in parallel with the above-named exciting-windings, and other exciting-windings connected at an intermediate point to the first-named exciting-windings and also connected to the single-phase mains through the phase-modifying devices.

3. In a single-phase alternating-current system of electrical distribution, an alternating-current motor having exciting-windings connected directly to the supply-mains of the system, phase-modifying devices consisting of a device having capacity and a device having inductance, connected across the said mains in parallel to the first-named exciting-windings, and other exciting-windings connected to the first-named exciting-windings at an intermediate point and connected at their free end to a point between the device having capacity and the device having inductance.

4. In a single-phase alternating-current system of electrical distribution, an alternating-current motor having exciting-windings connected directly to the supply-mains of the system, said exciting-coils containing no phase-shifting devices, phase-modifying devices consisting of a device having capacity and a device having inductance, connected in series across the said mains in parallel to the first-named exciting-windings, and other exciting-windings connected to the first-named exciting-windings at an intermediate point and connected at their free ends to a point between the device having capacity and the device having inductance.

5. In a single-phase alternating-current system of electrical distribution, an alternating-current motor having main and supplemental exciting-windings, the said main windings being connected directly to the supply-mains of the system, phase-modifying devices connected to said mains in parallel with the main exciting-windings and in series with the supplemental exciting-windings, the said supplemental windings being connected to the supply-mains of the system through the phase-modifying devices.

6. In a single-phase alternating-current system of distribution, an alternating-current motor having main and supplemental inducing-windings, the main windings connected directly to the supply-lines of the system, and the phase-modifying devices connected to the lines in parallel with the main inducing-windings and in series with the supplemental windings and connecting the latter to the mains, the phase-modifying devices being adjustable to produce the desired displacement of phase.

7. In a single-phase alternating-current system of distribution, an alternating-current motor having three sets of exciting-windings, two of the sets being connected directly to the supply-mains of the system, and phase-modifying devices connected to the mains in parallel with the direct connected windings and supplying current to the third winding, the windings and phase-modifying devices being so arranged that currents differing approximately by one-third of a period from each other flow in the respective exciting-windings.

8. The combination with a source of single-phase alternating current, of an alternating-current motor having a main winding supplied with single-phase current directly from the said source, two dissimilar phase-modifying devices, supplied with current from said source in series, and an additional winding or windings upon the said motor supplied with dephased current from the said source through the phase-modifying devices.

9. The combination with a source of single-phase alternating current, of an alternating-current motor receiving current from the said source, the inducing member of said motor being wound with a winding supplied directly from said source, and with an additional winding supplied from said source from a point between two dissimilar phase-modifying devices connected in series across the said source.

10. The combination with a source of single-phase alternating current, of an alternating-current motor receiving current from the said source, the inducing member of said motor being wound with a winding supplied directly from said source, and with an additional winding supplied from said source from a point between two dissimilar phase-modifying devices connected in series across the said source, and means for cutting out the additional winding.

11. The combination of the inducing member of an alternating-current motor, of a winding connected directly across a single-phase source, and an additional winding supplied with energy from said source, joined to a point between a source of leading currents and a self-induction coil, connected in series across the said source.

12. The combination in the inducing member of an alternating-current motor, of a winding connected directly across a single-phase source, an additional winding supplied with energy from said source, joined to a point between a condenser and a self-induction coil, connected in series across the said source, and means for adjusting the relative values of the condensance and reactance of the said condenser and self-induction coil.

In witness whereof we have hereunto set our hands.

CHARLES P. STEINMETZ.
ERNST J. BERG.

Witnesses:
A. F. MACDONALD,
S. W. TILDEN.